United States Patent
Liu et al.

(10) Patent No.: US 11,818,498 B2
(45) Date of Patent: Nov. 14, 2023

(54) SCREEN RECORDING METHOD AND APPARATUS, AND ELECTRONIC DEVICE

(71) Applicant: Lenovo (Beijing) Limited, Beijing (CN)

(72) Inventors: Haoyu Liu, Beijing (CN); Jianxun Zhou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 156 days.

(21) Appl. No.: 17/364,847

(22) Filed: Jun. 30, 2021

(65) Prior Publication Data
US 2022/0006971 A1   Jan. 6, 2022

(30) Foreign Application Priority Data
Jul. 1, 2020   (CN) .......................... 202010626216.4

(51) Int. Cl.
| | |
|---|---|
| H04N 5/92 | (2006.01) |
| G06T 11/00 | (2006.01) |
| G11B 27/031 | (2006.01) |
| G11B 27/10 | (2006.01) |
| H04N 5/265 | (2006.01) |
| H04N 5/272 | (2006.01) |
| H04N 5/76 | (2006.01) |
| H04N 9/82 | (2006.01) |
| H04N 21/44 | (2011.01) |
| H04N 21/433 | (2011.01) |
| G06F 17/00 | (2019.01) |

(52) U.S. Cl.
CPC ........... *H04N 5/9201* (2013.01); *G06T 11/00* (2013.01); *G11B 27/031* (2013.01); *G11B 27/10* (2013.01); *H04N 5/265* (2013.01); *H04N 5/272* (2013.01); *H04N 5/76* (2013.01); *H04N 9/8227* (2013.01); *H04N 21/4334* (2013.01); *H04N 21/44016* (2013.01)

(58) Field of Classification Search
CPC ...... H04N 5/9201; H04N 5/265; H04N 5/272; H04N 9/8227; H04N 21/4334; H04N 5/76; H04N 21/44016; G06T 11/00; G11B 27/031; G11B 27/10
See application file for complete search history.

(56) References Cited

U.S. PATENT DOCUMENTS

| | | | |
|---|---|---|---|
| 10,248,440 B1* | 4/2019 | Sharifi | G06F 40/134 |
| 2017/0075561 A1* | 3/2017 | Ghazanfari | G06F 3/0488 |
| 2019/0174069 A1* | 6/2019 | Poindexter, Jr. | H04N 23/63 |
| 2020/0382828 A1* | 12/2020 | Chen | H04N 21/4147 |

FOREIGN PATENT DOCUMENTS

| | | |
|---|---|---|
| CN | 102279739 A | 12/2011 |
| CN | 108052261 A | 5/2018 |

* cited by examiner

*Primary Examiner* — Quoc A Tran
(74) *Attorney, Agent, or Firm* — ANOVA LAW GROUP, PLLC (57) ABSTRACT

A screen recording method includes obtaining operation data of an electronic device and response data generated by the electronic device based on the operation data; obtaining a virtual device image matching the electronic device; and associating the operation data and the response data with the virtual device image according to a pre-determined processing strategy to generate a first video.

20 Claims, 2 Drawing Sheets

SCREEN RECORDING METHOD AND APPARATUS, AND ELECTRONIC DEVICE

CROSS-REFERENCE TO RELATED APPLICATION

This application claims priorities to Chinese Patent Application No. 202010626216.4 filed on Jul. 1, 2020, the entire content of which is incorporated herein by reference.

TECHNICAL FIELD

The present disclosure relates to the technical field of electronics and, more particularly, to a screen recording method and apparatus, and an electronic device.

BACKGROUND

A screen recording function is a process of recording operations and changes on a screen. After the screen recording is over, a video will be produced. A user may view recorded screen content by watching the video. However, the user can only see the changes of the screen, such as a process of the screen turning dark and bright. The user cannot know any operations outside the screen. Thus, the screen recording content is relatively simple and the system performance is undesired.

SUMMARY

One aspect of the present disclosure includes a screen recording method. The method includes: obtaining operation data of an electronic device and response data generated by the electronic device based on the operation data; obtaining a virtual device image matching the electronic device; and associating the operation data and the response data with the virtual device image according to a pre-determined processing strategy to generate a first video.

Another aspect of the present disclosure includes a screen recording apparatus. The apparatus includes: a first acquisition circuit configured to obtain operation data of an electronic device and response data generated by the electronic device based on the operation data; a second acquisition circuit configured to obtain a virtual device image matching the electronic device; and a first generation circuit configured to associate the operation data and the response data with the virtual device image according to a pre-determined processing strategy to generate a first video.

Another aspect of the present disclosure includes an electronic device. The electronic device includes a memory storing a computer program and a processor configured to execute the computer program to: obtain operation data of the electronic device and response data generated by the electronic device based on the operation data; obtain a virtual device image matching the electronic device; and associate the operation data and the response data with the virtual device image according to a pre-determined processing strategy to generate a first video.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure. In addition, under circumstances of no conflict, the embodiments and the features in the embodiments may be combined with each other.

In the following description, many details are explained in order to fully comprehend the present disclosure. However, the present disclosure can also be implemented in other ways different from those described herein. Those skilled in the art may do so without departing from the scope of the present disclosure. Therefore, the present disclosure is not limited by the embodiments described below.

Unless other defines, the technical and scientific terms used in the specification shall have the usual meanings understood by those with ordinary skills in the art to which this application belongs. The "first," "second," and similar words used in the specification do not denote any order, quantity or importance, but are only used to distinguish different components. "Include," "contain," and other similar words mean that an element or an item appearing before the word covers elements or items listed after the word and the equivalent thereof, but does not exclude other elements or items. "Connected," "attached," and other similar words are limited to physical or mechanical connections, but may include electrical connections directly or indirectly. "Up," "down," "left," and "right", etc. are only used to indicate a relative position relationship. After an absolute position of a described object changes, the relative position relationship may also change accordingly.

To keep the following description of the embodiments of the present disclosure clear and concise, detailed descriptions of known functions and known components are omitted.

Figure 1:
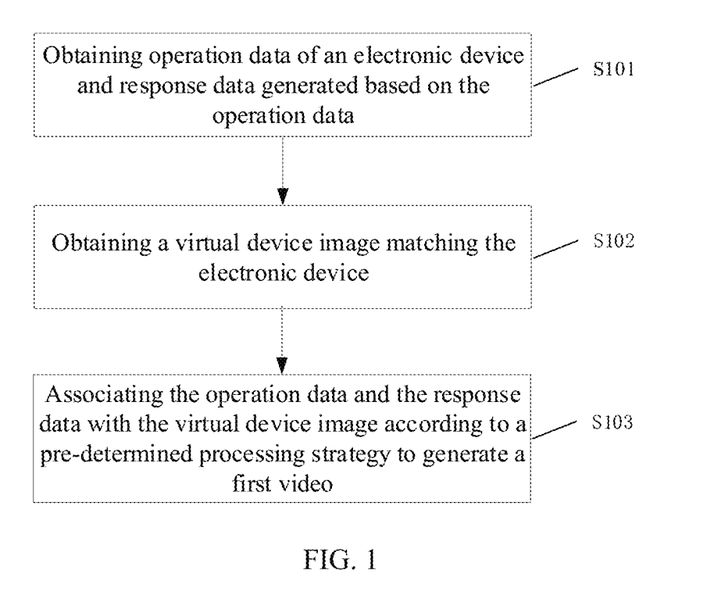
FIG. 1 is a flowchart of an exemplary screen recording method according to some embodiments of the present disclosure.

The present disclosure provides a screen recording method. FIG. 1 is a flowchart of an exemplary screen recording method according to some embodiments of the present disclosure. As shown in FIG. 1, the method includes the following processes.

At S101, operation data of an electronic device and response data generated based on the operation data are obtained.

In some embodiments, the electronic device includes a mobile phone, a tablet computer, a personal digital assistant (PDA), and a laptop computer, etc., which is not limited by the present disclosure. In a process of obtaining the operation data of the electronic device, one or more operation data of the electronic device itself, a component of the electronic device, and a device associated with the electronic device may be obtained. The component of the electronic device may be part of the electronic device that is used to obtain data and/or perform operations, such as a gyroscope, a physical button, a touch-control screen, and a touch-control panel, etc. The device associated with the electronic device may be a device that makes the electronic device generate the response data based on the operation data, such as a camera, a mouse, a keyboard, a remote-controller, an earphone, a speaker, and a gamepad, etc.

In some embodiments, in a process of recording a screen, an operator uses the touch-control screen, the keyboard, and the mouse at the same time to operate the electronic device. The operation data may be obtained from the touch-control screen, the keyboard, and the mouse.

The response data may be generated by the electronic device based on the operation data. For example, the electronic device is a mobile phone. To record a screen of the mobile phone, the operator presses a physical button on a peripheral frame of the mobile phone to generate the operation data. An image shown on the screen is the response data. Each one of the operation data corresponds to one response data. The response data may be displayed on the screen or may not be displayed on the screen. Since the objective of the present disclosure is screen recording, the embodiments of the present disclosure focus on the response data displayed on the screen.

At S102, a virtual device image matching the electronic device is obtained.

In a process of obtaining the virtual device image matching the electronic device, the virtual device image may be a virtual device image of an associated device when the operation data is obtained from the associated device of the electronic device.

In some embodiments, a source of the operation data may be used to determine whether a device that generates the operation data is the associated device of the electronic device. When the associated device generates the operation data, parameter information of the associated device may be obtained. Based on the parameter information, the virtual device image of the associated device may be generated.

When the operation data is generated based on the electronic device itself or the component thereof, the operation data may be obtained without receiving externally through a transceiver unit (e.g., a WiFi transceiver unit). When the operation data is obtained from the transceiver unit, the associated device is present. Receiving the operation data through the transceiver unit only determines the presence of the associated device. But a quantity and a type of the associated device are still unknown. For example, both the mouse and the keyboard may control a computer at the same time. Further, when the computer includes a touch-control screen, the source of the operation data may be the touch-control screen, the keyboard, and the mouse.

After the presence of the associated device is determined, the parameter information of the associated device may be obtained. The parameter information may include at least one of the type or the model of the associated device. For example, when the type of the associated device is a keyboard, regardless of the model of the keyboard, various keyboards look similar. As such, the virtual device image corresponding to the keyboard may be obtained. In some embodiments, when the model of the keyboard can be obtained, a first video resulted from the screen recording may reflect operator's use habit more truthfully, thereby achieving better user experience.

At S103, the operation data and the response data are associated with the virtual device image according to a pre-determined processing strategy to generate a first video.

In some embodiments, the operation data and the response data obtained in a screen recording process are associated with the virtual device image, such that the first video includes not only the response data, but also the virtual device image and the operation data. The screen recording has rich content. Further, the first video reflects the operation of the electronic device more intuitively, thereby making it suitable for guiding users to configure the electronic device.

In someone embodiment, associating the operation data and the response data with the virtual device image according to the pre-determined processing strategy to generate the first video includes associating a first sub-video generated from the operation data and a second sub-video generated from the response data with the virtual device image according to at least one of a point in time of obtaining the operation data or determined target response data to generate the first video.

In the screen recording process, regardless of the operation data, the screen recording operates continuously. As such, the obtained first video includes the entire screen recording process. In this case, the obtained first video may not be what a user wants. Thus, in the embodiments of the present disclosure, the first video is generated based on the following three processing strategies.

In the first process strategy, because each operation data corresponds to a point in time. The operation data and the response data at the point in time are often more interested by the user. Thus, the operation data obtained at the point in time may be used to generate the first sub-video, and the first sub-video and the second sub-video generated from the response data are associated with the virtual device image to generate the first video.

In some embodiments, the above process may be implemented as follows. A first point in time of obtaining the operation data is determined. The first sub-video is generated from the operation data corresponding to the first point in time. The second sub-video is generated from the response data corresponding to the operation data. The first sub-video and the second sub-video are associated with the virtual device image to generate the first video. In the first video obtained based on the first processing strategy, the content of the entire screen recording is the content of interest to the user. Even if the screen recording process is long, the first video resulted from the screen recording process is relatively short and completely captures the contents of the screen recording corresponding to each one of the operation data.

Take the electronic device being a mobile phone as an example. The first sub-video is a video capturing operation state outside the screen of the mobile phone. The first sub-video may be an animation that simulates a user's finger pressing a button. The virtual device image includes a peripheral frame of the mobile phone and physical buttons on the peripheral frame. The second sub-video includes the contents displayed on the screen of the mobile phone. Because the first sub-video is a filtered video including only the operation data corresponding to at least one of the point in time of the operation data or the determined target response data, the second sub-video also only includes the response data corresponding to the filtered operation data.

In the second processing strategy, due to the presence of the operation data, each one of the operation data corresponds to one response data. In some embodiments, the first sub-video may be generated from the operation data filtered based on the determined target response data. The target response data is a part of the response data and is filtered from the entire response data. That is, the target response data is the part of the response data that is desired to be included in the first video.

In some embodiments, the above process may be implemented as follows. A target response data is determined. The first sub-video is generated from the operation data corresponding to the determined target response data. The second sub-video is generated from the target response data. The first sub-video and the second sub-video are associated with the virtual device image to generate the first video. In the first video obtained based on the second processing strategy, the content of the entire screen recording is the content of interest to the user. Even if the screen recording process is long, the first video resulted from the screen recording process is relatively short and completely captures the contents of the screen recording corresponding to each one of the operation data.

In the third processing strategy, both the point in time of obtaining the operation data and the determined target response data may be used to generate the first video. That is, the first sub-video may be generated from the operation data filtered based on the point in time of obtaining the operation data and the determined target response data.

In some embodiments, the above process may be implemented as follows. A second point in time of obtaining target operation data is determined. The first sub-video is generated from the operation data corresponding to the second point in time. The second sub-video is generated from the determined target response data. The first sub-video and the second sub-video are associated with the virtual device image to generate the first video. The target operation data is a part of the entire operation data and is filtered from the entire response data. That is, the target operation data is the part of the operation data that is desired to be included in the first video. In other words, some of the operation data corresponding to the first point in time are selected as the target operation data. Correspondingly, the second point in time is a part of the first point in time. The second point in time is the point in time that is desired to be included in the first video. The target response data is also the part of the response data that is desired to be included in the first video. Regardless of being obtained based on the second point in time or the target response data, the operation data includes the content of interest to the user. In the first video obtained based on the third processing strategy, the content of the entire screen recording is the content of interest to the user. Even if the screen recording process is long, the first video resulted from the screen recording process is relatively short and completely captures the contents of the screen recording corresponding to each one of the operation data.

Take the electronic device being a computer as an example. The associated device includes a mouse and a keyboard. Double clicking on a left key of the mouse generates first operation data and a computer screen display corresponding first response data. Single clicking on a right key of the mouse generates second operation data and the computer screen displays corresponding second response data. The keyboard generates third operation data and the computer screen displays corresponding third response data. Each operation is separated by a time period. In the screen recording process, the screen recording starts after a screen recording start operation is received and the screen recording ends after a screen recording end operation is received. The generated screen recording video includes all the video frames from the beginning to the end of the screen recording.

When the first processing strategy is used, the first point in time may include each time for an occurrence of the operation data. The obtained first video only includes the content of the screen recording at the three first point in times. The first point in time may only include the point in times corresponding to mouse operations. Then obtained first video only includes the content of the screen recording at the two first point in times corresponding to the two mouse operations.

When the second processing strategy is used, the target response data may only include the response data corresponding to the mouse operations (i.e., the first response data and the second response data) or may include the first response data and the third response data.

When the third processing strategy is used, the second point in time may only include the point in time corresponding to the first operation data, and the target response data may only include the third response data. The specific implementation may be determined by a technical person according to actual scenarios and requirements.

In one embodiment, the operation data is processed to generate the first sub-video and the corresponding process may be implemented as follows. Based on the operation data, simulated operations to be performed on at least one of the electronic device itself, the component of the electronic device, or the associated device of the electronic device are generated. The simulated operations are used to generate the first sub-video according to at least the point in time or the corresponding response data. In another embodiment, the first sub-video and the second sub-video are associated with the virtual device image to generate the first video and the corresponding process may be implemented as follows. In one example, video frames of the first sub-video and video frames of the second sub-video are superimposed on the virtual device image to generate the first video. In another example, the video frames of the first sub-video and the video frames of the second sub-video are tiled on an inside and an outside of the virtual device image respectively to generate the first video.

Figure 2:
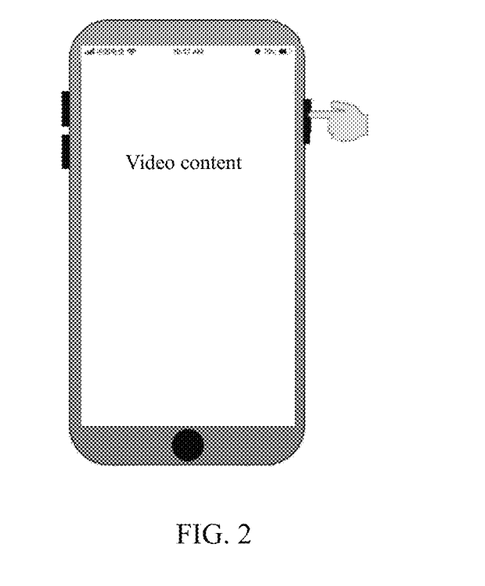
FIG. 2 is a schematic diagram illustrating an animation included in an exemplary screen recording according to some embodiments of the present disclosure.
Figure 3:
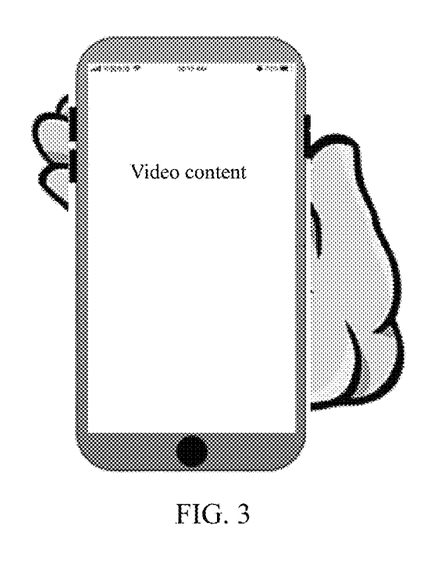
FIG. 3 is a schematic diagram illustrating an animation included in another exemplary screen recording according to some embodiments of the present disclosure.

The simulated operations include animated illustration. For example, when a user presses a physical button of the mobile phone, a hand image may be generated in an animated manner. As shown in FIG. 2, an animated hand image is superimposed onto the virtual device image. In this case, the first sub-video includes the animated hand image, the second sub-video includes images on the screen of the mobile phone, and the virtual device image includes an appearance of the mobile phone.

In one embodiment, the operation data and the response data are associated with the virtual device image according to a pre-determined processing strategy to generate the first video, and the corresponding process may be implemented as follows. A performance parameter of at least one of the electronic device itself or a target device is obtained. The operation data and the response data are associated with the virtual device image at least based on the performance parameter to generate the first video. The target device is a device that receives the first video.

The above process considers the performance parameter of the electronic device or the target device. The performance parameter can be, for example, a processing speed, a storage capacity, a resolution, a refresh rate, a network connection status, and a quantity of display terminals, etc. In actual implementation, when the performance parameter of at least one of the electronic device or the target device is insufficient, the content of the screen recording may be processed based on the performance parameter in the screen recording process to generate the first video that satisfy the performance parameter of at least the electronic device or the target device. For example, the electronic device may have a relatively small storage capacity. Even if only the content about the operation data at the corresponding point in time is recorded, the first video may still exceed the storage capacity. In this case, a quantity of the video frames in each sub-video may be reduced in the recording process. For example, 10 images frames may be reduced to 5 image frames to further reduce the need for the storage capacity.

In some embodiments, the screen recording method may further include the following process. In the process of obtaining at least one of the operation data or the response data, a first image acquisition circuit obtains a second video and/or a second image acquisition circuit obtains a third video. At least one of the second video or the third video is merged with the first video to generate a fourth video. The first image acquisition circuit and the second image acquisition circuit are disposed on two opposite sides of the electronic device, respectively.

When the electronic device is a mobile phone, the first image acquisition circuit and the second image acquisition circuit may be a front camera and a rear camera of the mobile phone. When the second video or the third video includes a target object, the target object may be processed, and an image of the processed target object is associated with the fourth video. In actual implementation, the target object may be processed into a virtual image or a cartoon image of the target object. The virtual image or the cartoon image of the target object is combined with the operation data to be associated with the fourth video. For example, when the target object is a person, the person may be processed into the carton image of the person. The carton image is combined with the animation image of the operation data. The combined image is then associated with the fourth video. In the generated screen recording video, the cartoon image of the person operates the physical button of the mobile phone. Correspondingly, the operation of the physical button generates the animation corresponding to the response data on the screen of the mobile phone.

In the embodiments of the present disclosure, the screen recording function is enhanced to include more information in the screen recording video. A viewer of the screen recording video may watch intuitively how the electronic device is operated. The screen recording performance is improved. It is convenient to use the first video to guide people to configure the electronic device with desired user experience.

Figure 4:
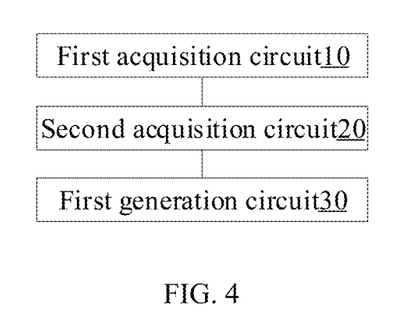
FIG. 4 is a structural diagram illustrating an exemplary screen recording apparatus according to some embodiments of the present disclosure.

Based on the same inventive concept, the present disclosure also provides a screen recording apparatus. FIG. 4 is a structural diagram illustrating an exemplary screen recording apparatus according to some embodiments of the present disclosure. As shown in FIG. 4, the apparatus includes a first acquisition circuit 10, a second acquisition circuit 20, and a first generation circuit 30.

The first acquisition circuit 10 is configured to obtain operation data of an electronic device and response data generated by the electronic device based on the operation data. The second acquisition 20 is coupled with the first acquisition circuit 10 to obtain a virtual device image matching the electronic device. The first generation circuit 30 is coupled with the second acquisition circuit 30 to associate the operation data and the response data with the virtual device image according to a pre-determined processing strategy to generate a first video.

In some embodiments, the electronic device includes a mobile phone, a tablet computer, a personal digital assistant (PDA), and a laptop computer, etc., which is not limited by the present disclosure. In a process of obtaining the operation data of the electronic device, the first acquisition circuit 10 is configured to obtain one or more operation data of the electronic device itself, a component of the electronic device, and a device associated with the electronic device. The component of the electronic device may be part of the electronic device that is used to obtain data and/or perform operations, such as a gyroscope, a physical button, a touch-control screen, and a touch-control panel, etc. The device associated with the electronic device may be a device that makes the electronic device generate the response data based on the operation data, such as a camera, a mouse, a keyboard, a remote-controller, an earphone, a speaker, and a gamepad, etc.

In some embodiments, in a process of recording a screen, an operator uses the touch-control screen, the keyboard, and the mouse at the same time to operate the electronic device. The operation data may be obtained from the touch-control screen, the keyboard, and the mouse.

The response data may be generated by the electronic device based on the operation data. For example, the electronic device is a mobile phone. To record a screen of the mobile phone, the operator presses a physical button on a peripheral frame of the mobile phone to generate the operation data. An image shown on the screen is the response data. Each one of the operation data corresponds to one response data. The response data may be displayed on the screen or may not be displayed on the screen. Since the objective of the present disclosure is screen recording, the embodiments of the present disclosure focus on the response data displayed on the screen.

In a process of obtaining the virtual device image matching the electronic device, the virtual device image may be a virtual device image of an associated device when the operation data is obtained from the associated device of the electronic device. The second acquisition circuit 20 may be configured to: use a source of the operation data to determine whether a device that generates the operation data is the associated device of the electronic device; when the associated device generates the operation data, obtain parameter information of the associated device; and based on the parameter information, generate the virtual device image of the associated device.

When the operation data is generated based on the electronic device itself or the component thereof, the operation data may be obtained without receiving externally through a transceiver unit (e.g., a WiFi transceiver unit). When the operation data is obtained from the transceiver unit, the associated device is present. Receiving the operation data through the transceiver unit only determines the presence of the associated device. But a quantity and a type of the associated device are still unknown. For example, both the mouse and the keyboard may control a computer at the same time. Further, when the computer includes a touch-control screen, the source of the operation data may be the touch-control screen, the keyboard, and the mouse.

After the presence of the associated device is determined, the parameter information of the associated device may be obtained. The parameter information may include at least one of the type or the model of the associated device. For example, when the type of the associated device is a keyboard, regardless of the model of the keyboard, various keyboards look similar. As such, the virtual device image corresponding to the keyboard may be obtained. In some embodiments, when the model of the keyboard can be obtained, a first video resulted from the screen recording may reflect operator's use habit more truthfully, thereby achieving better user experience.

In some embodiments, the operation data and the response data obtained in a screen recording process are associated with the virtual device image, such that the first video includes not only the response data, but also the virtual device image and the operation data. The screen recording has rich content. Further, the first video reflects the operation of the electronic device more intuitively, thereby making it suitable for guiding users to configure the electronic device.

In some embodiment, the first generation circuit 30 is configured to associate a first sub-video generated from the operation data and a second sub-video generated from the response data with the virtual device image according to at least one of a point in time of obtaining the operation data or determined target response data to generate the first video.

In the screen recording process, regardless of the operation data, the screen recording operates continuously. As such, the obtained first video includes the entire screen recording process. In this case, the obtained first video may not be what a user wants. Thus, in the embodiments of the present disclosure, the first video is generated based on the following three processing strategies.

In the first process strategy, a first point in time of obtaining the operation data is determined. The first sub-video is generated from the operation data corresponding to the first point in time. The second sub-video is generated from the response data corresponding to the operation data. The first sub-video and the second sub-video are associated with the virtual device image to generate the first video.

Take the electronic device being a mobile phone as an example. The first sub-video is a video capturing operation state outside the screen of the mobile phone. The first sub-video may be an animation that simulates a user's finger pressing a button. The virtual device image includes a peripheral frame of the mobile phone and physical buttons on the peripheral frame. The second sub-video includes the contents displayed on the screen of the mobile phone. Because the first sub-video is a filtered video including only the operation data corresponding to at least one of the point in time of the operation data or the determined target response data, the second sub-video also only includes the response data corresponding to the filtered operation data.

In the second processing strategy, a target response data is determined. The first sub-video is generated from the operation data corresponding to the determined target response data. The second sub-video is generated from the target response data. The first sub-video and the second sub-video are associated with the virtual device image to generate the first video.

In the third processing strategy, a second point in time of obtaining target operation data is determined. The first sub-video is generated from the operation data corresponding to the second point in time. The second sub-video is generated from the determined target response data. The first sub-video and the second sub-video are associated with the virtual device image to generate the first video.

In the first video obtained based on the above processing strategies, the content of the entire screen recording is the content of interest to the user. Even if the screen recording process is long, the first video resulted from the screen recording process is relatively short and completely captures the contents of the screen recording corresponding to each one of the operation data.

Take the electronic device being a computer as an example. The associated device includes a mouse and a keyboard. Double clicking on a left key of the mouse generates first operation data and a computer screen display corresponding first response data. Single clicking on a right key of the mouse generates second operation data and the computer screen displays corresponding second response data. The keyboard generates third operation data and the computer screen displays corresponding third response data. Each operation is separated by a time period. In the screen recording process, the screen recording starts after a screen recording start operation is received and the screen recording ends after a screen recording end operation is received. The generated screen recording video includes all the video frames from the beginning to the end of the screen recording.

When the first processing strategy is used, the first point in time may include each time for an occurrence of the operation data. The obtained first video only includes the content of the screen recording at the three first point in times. The first point in time may only include the point in times corresponding to mouse operations. Then obtained first video only includes the content of the screen recording at the two first point in times corresponding to the two mouse operations.

When the second processing strategy is used, the target response data may only include the response data corresponding to the mouse operations (i.e., the first response data and the second response data) or may include the first response data and the third response data.

When the third processing strategy is used, the second point in time may only include the point in time corresponding to the first operation data, and the target response data may only include the third response data. The specific implementation may be determined by a technical person according to actual scenarios and requirements.

In one embodiment, the first generation circuit 30 is configured to process the operation data to generate the first sub-video and the corresponding process may be implemented as follows. Based on the operation data, simulated operations to be performed on at least one of the electronic device itself, the component of the electronic device, or the associated device of the electronic device are generated. The simulated operations are used to generate the first sub-video according to at least the point in time or the corresponding response data. In another embodiment, the first sub-video and the second sub-video are associated with the virtual device image to generate the first video and the corresponding process may be implemented as follows. In one example, video frames of the first sub-video and video frames of the second sub-video are superimposed on the virtual device image to generate the first video. In another example, the video frames of the first sub-video and the video frames of the second sub-video are tiled on an inside and an outside of the virtual device image respectively to generate the first video. The simulated operations include animated illustration. For example, when a user presses a physical button of the mobile phone, a hand image may be generated in an animated manner.

In one embodiment, the first generation circuit 30 is configured to associate the operation data and the response data with the virtual device image according to a determined processing strategy to generate the first video, and the corresponding process may be implemented as follows. A performance parameter of at least one of the electronic device itself or a target device is obtained. The operation data and the response data are associated with the virtual device image at least based on the performance parameter to generate the first video. The target device is a device that receives the first video.

The above process considers the performance parameter of the electronic device or the target device. The performance parameter can be, for example, a processing speed, a storage capacity, a resolution, a refresh rate, a network connection status, and a quantity of display terminals, etc. In actual implementation, when the performance parameter of at least one of the electronic device or the target device is insufficient, the content of the screen recording may be processed based on the performance parameter in the screen recording process to generate the first video that satisfy the performance parameter of at least the electronic device or the target device. For example, the electronic device may have a relatively small storage capacity. Even if only the content about the operation data at the corresponding point in time is recorded, the first video may still exceed the storage capacity. In this case, a quantity of the video frames in each sub-video may be reduced in the recording process. For example, 10 images frames may be reduced to 5 image frames to further reduce the need for the storage capacity.

In some embodiments, the screen recording apparatus may further include a third acquisition circuit configured to obtain a second video acquired by a first image acquisition circuit and/or a third video acquired by a second image acquisition circuit in the process of obtaining at least one of the operation data or the response data, and a second generation circuit configured to merge at least one of the second video or the third video with the first video to generate a fourth video. The first image acquisition circuit and the second image acquisition circuit are disposed on two opposite sides of the electronic device, respectively.

When the electronic device is a mobile phone, the first image acquisition circuit and the second image acquisition circuit may be a front camera and a rear camera of the mobile phone. The second generation circuit is configured to, when the second video or the third video includes a target object, process the target object and associate an image of the processed target object with the fourth video. In actual implementation, the target object may be processed into a virtual image or a cartoon image of the target object. The virtual image or the cartoon image of the target object is combined with the operation data to be associated with the fourth video. For example, when the target object is a person, the person may be processed into the carton image of the person. The carton image is combined with the animation image of the operation data. The combined image is then associated with the fourth video. In the generated screen recording video, the cartoon image of the person operates the physical button of the mobile phone. Correspondingly, the operation of the physical button generates the animation corresponding to the response data on the screen of the mobile phone.

In the embodiments of the present disclosure, the screen recording function is enhanced to include more information in the screen recording video. A viewer of the screen recording video may watch intuitively how the electronic device is operated. The screen recording performance is improved. It is convenient to use the first video to guide people to configure the electronic device with desired user experience.

Figure 5:
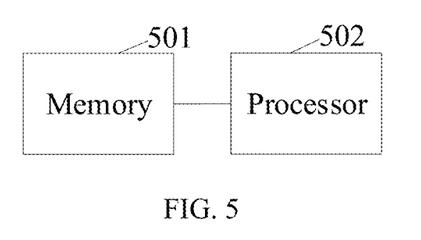
FIG. 5 is a structural diagram illustrating an exemplary electronic device according to some embodiments of the present disclosure.

Based on the same inventive concept, the present disclosure also provides an electronic device. FIG. 5 is a structural diagram illustrating an exemplary electronic device according to some embodiments of the present disclosure. As shown in FIG. 5, the electronic device includes a memory 501 and a processor 502. The memory 501 stores a computer program. The processor 502 executes the computer program in the memory 501 to implement the screen recording method according to the embodiments of the present disclosure. In some embodiments, the computer program of the electronic device includes obtaining operation data of the electronic device and response data generated based on the operation data; obtaining a virtual device image matching the electronic device; and associating the operation data and the response data with the virtual device image according to a pre-determined processing strategy to generate a first video.

In some embodiments, when obtaining the operation data of the electronic device, the processor 502 is configured to execute the computer program in the memory 501 to obtain the operation data of at least one of the electronic device itself, a component of the electronic device, or an associated device of the electronic device. The associated device is a device that makes the electronic device generate response data based on the operation data.

In some embodiments, when obtaining the virtual device image matching the electronic device, the processor 502 is configured to execute the computer program in the memory 501 to determine based on a source of the operation data whether a device that generates the operation data is the associated device of the electronic device; when the associated device generates the operation data, obtain parameter information of the associated device; and based on the parameter information, generate the virtual device image of the associated device.

In some embodiments, when associating the operation data and the response data with the virtual device image according to the pre-determined processing strategy to generate the first video, the processor 502 executes the computer program in the memory 501 to associate a first sub-video generated from the operation data and a second sub-video generated from the response data with the virtual device image according to at least one of a point in time of obtaining the operation data or determined target response data to generate the first video.

In some embodiments, when associating the first sub-video generated from the operation data and the second sub-video generated from the response data with the virtual device image according to at least one of the point in time of obtaining the operation data or the determined target response data to generate the first video, the processor 502 executes the computer program in the memory 501 to determine a first point in time of obtaining the operation data; generate the first sub-video from the operation data corresponding to the first point in time; generate the second sub-video from the response data corresponding to the operation data; and associate the first sub-video and the second sub-video with the virtual device image to generate the first video.

In some embodiments, the processor 502 executes the computer program in the memory 501 to determine a target response data is determined; generate the first sub-video from the operation data corresponding to the determined target response data; generate the second sub-video from the target response data; and associate the first sub-video and the second sub-video are associated with the virtual device image to generate the first video.

In some embodiments, the processor 502 executes the computer program in the memory 501 to determine a second point in time of obtaining target operation data; generate the first sub-video from the operation data corresponding to the second point in time; generate the second sub-video from the determined target response data; and associate the first sub-video and the second sub-video with the virtual device image to generate the first video.

In some embodiments, when processing the operation data to generate the first sub-video, the processor 502 executes the computer program in the memory 501 to generate simulated operations to be performed on at least one of the electronic device itself, the component of the electronic device, or the associated device of the electronic device based on the operation data; and generate the first sub-video according to at least the point in time or the corresponding response data.

In some embodiments, when associating the first sub-video and the second sub-video with the virtual device image to generate the first video, the processor 502 executes the computer program in the memory 501 to superimpose video frames of the first sub-video and video frames of the second sub-video on the virtual device image to generate the first video, or to tile the video frames of the first sub-video and the video frames of the second sub-video on an inside and an outside of the virtual device image respectively to generate the first video.

In some embodiments, when associating the operation data and the response data with the virtual device image according to a pre-determined processing strategy to generate the first video, the processor 502 executes the computer program in the memory 501 to obtain a performance parameter of at least one of the electronic device itself or a target device; and associate the operation data and the response data with the virtual device image at least based on the performance parameter to generate the first video. The target device is a device that receives the first video.

In some embodiments, in the process of obtaining at least one of the operation data or the response data, a first image acquisition circuit obtains a second video and/or a second image acquisition circuit obtains a third video. At least one of the second video or the third video is merged with the first video to generate a fourth video. The first image acquisition circuit and the second image acquisition circuit are disposed on two opposite sides of the electronic device, respectively.

In some embodiments, the processor 502 executes the computer program in the memory 501 to process a target object when the second video or the third video includes the target object; and associate an image of the processed target object with the fourth video.

In the embodiments of the present disclosure, the screen recording function is enhanced to include more information in the screen recording video. A viewer of the screen recording video may watch intuitively how the electronic device is operated. The screen recording performance is improved. It is convenient to use the first video to guide people to configure the electronic device with desired user experience.

In addition, although exemplary embodiments have been described herein, their scope includes any and all implementations with equivalent elements, modifications, omissions, combinations (e.g., cross-over schemes of various embodiments), adaptations, or changes based on the present disclosure. The elements in the claims will be interpreted broadly based on the language adopted in the claims, are not limited to the examples described in the specification or during the implementation of the present disclosure, and the examples will be interpreted as non-exclusive. Therefore, the specification and embodiments are intended to be regarded as examples only, and the true scope and spirit are indicated by the appended claims and the full scope of their equivalents.

The above description is intended to be illustrative and not restrictive. For example, the aforementioned embodiments (one or more solutions) may be combined with each other. Other embodiments may be used by those skilled in the art when reading the specification. In addition, in the aforementioned embodiments, various features may be grouped tother to simplify the description. This should not be construed as an intent that an unclaimed disclosed feature is necessary for any claim. On the contrary, the subject matter of the present disclosure may be less than all the features of the disclosed embodiments. Thus, the appended claims are incorporated into the detailed description as examples or embodiments, where each claim independently serves as a separate embodiment, and it is considered that these embodiments can be combined with each other in various combinations or permutations. The scope of the present disclosure should be determined with reference to the appended claims and the full scope of the equivalents entitled by these claims.

In the specification, specific examples are used to explain the principles and implementations of the present disclosure. The description of the embodiments is intended to assist comprehension of the methods and core ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. A screen recording method, comprising:
    obtaining operation data of an electronic device and response data generated by the electronic device based on the operation data;
    obtaining a virtual device image matching the electronic device, the virtual device image including an appearance of the electronic device; and
    associating the operation data and the response data with the virtual device image according to a pre-determined processing strategy to generate a first video, the first video including:
        a first sub-video capturing an operation state outside a screen of the electronic device; and
        a second sub-video including contents displayed on the screen of the electronic device.

2. The method according to claim 1, wherein obtaining the operation data of the electronic device includes:
    obtaining the operation data of at least one of the electronic device itself, a component of the electronic device, or an associated device of the electronic device, the associated device being a device that causes the electronic device to generate the response data based on the operation data.

3. The method according to claim 2, wherein obtaining the virtual device image matching the electronic device includes:
    determining whether a device that generates the operation data is the associated device of the electronic device through a source of the operation data;
    when the associated device generates the operation data, obtaining parameter information of the associated device; and based on the parameter information, generating the virtual device image of the associated device.

4. The method according to claim 1, wherein associating the operation data and the response data with the virtual device image according to the pre-determined processing strategy to generate the first video includes:
associating the first sub-video generated from the operation data and the second sub-video generated from the response data with the virtual device image to generate the first video according to at least one of a point in time of obtaining the operation data or determined target response data.

5. The method according to claim 4, wherein associating the first sub-video generated from the operation data and the second sub-video generated from the response data with the virtual device image to generate the first video according to at least one of the point in time of obtaining the operation data or the determined target response data includes:
determining a first point in time of obtaining the operation data, generating the first sub-video from the operation data corresponding to the first point in time, generating the second sub-video from the response data corresponding to the operation data, and associating the first sub-video and the second sub-video with the virtual device image to generate the first video; or
determining a target response data, generating the first sub-video from the operation data corresponding to the determined target response data, generating the second sub-video from the target response data, and associating the first sub-video and the second sub-video with the virtual device image to generate the first video; or
determining a second point in time of obtaining target operation data, generating the first sub-video from the operation data corresponding to the second point in time, generating the second sub-video from the determined target response data; and associating the first sub-video and the second sub-video with the virtual device image to generate the first video.

6. The method according to claim 5, wherein:
processing the operation data to generate the first sub-video includes generating simulated operations to be performed on at least one of the electronic device itself, the component of the electronic device, or the associated device of the electronic device based on the operation data, and generating the first sub-video according to at least the point in time or the corresponding response data; and/or
associating the first sub-video and the second sub-video with the virtual device image to generate the first video includes superimposing video frames of the first sub-video and video frames of the second sub-video on the virtual device image to generate the first video, or tiling the video frames of the first sub-video and the video frames of the second sub-video on an inside and an outside of the virtual device image respectively to generate the first video.

7. The method according to claim 1, wherein associating the operation data and the response data with the virtual device image according to the pre-determined processing strategy to generate the first video includes:
obtaining a performance parameter of at least one of the electronic device itself or a target device; and
associating the operation data and the response data with the virtual device image at least based on the performance parameter to generate the first video, the target device being a device that receives the first video.

8. The method according to claim 1, further comprising:
in the process of obtaining at least one of the operation data or the response data, obtaining at least one of a second video acquired by a first image acquisition circuit or a third video acquired by a second image acquisition circuit; and
merging at least one of the second video or the third video with the first video to generate a fourth video,
wherein the first image acquisition circuit and the second image acquisition circuit are disposed on two opposite sides of the electronic device, respectively.

9. The method according to claim 8, further comprising:
processing a target object when the second video or the third video includes the target object; and;
associating an image of the processed target object with the fourth video.

10. The method according to claim 1, wherein the virtual device image includes a peripheral frame of the electronic device and physical buttons on the peripheral frame.

11. A screen recording apparatus, comprising:
a first acquisition circuit configured to obtain operation data of an electronic device and response data generated by the electronic device based on the operation data;
a second acquisition circuit configured to obtain a virtual device image matching the electronic device, the virtual device image including an appearance of the electronic device; and
a first generation circuit configured to associate the operation data and the response data with the virtual device image according to a pre-determined processing strategy to generate a first video, the first video including:
a first sub-video capturing an operation state outside a screen of the electronic device; and
a second sub-video including contents displayed on the screen of the electronic device.

12. The apparatus according to claim 11, wherein obtaining the operation data of the electronic device includes:
obtaining the operation data of at least one of the electronic device itself, a component of the electronic device, or an associated device of the electronic device, the associated device being a device that causes the electronic device to generate the response data based on the operation data.

13. The apparatus according to claim 12, wherein obtaining the virtual device image matching the electronic device includes:
determining whether a device that generates the operation data is the associated device of the electronic device through a source of the operation data;
when the associated device generates the operation data, obtaining parameter information of the associated device; and
based on the parameter information, generating the virtual device image of the associated device.

14. The apparatus according to claim 11, wherein associating the operation data and the response data with the virtual device image according to the pre-determined processing strategy to generate the first video includes:
associating the first sub-video generated from the operation data and the second sub-video generated from the response data with the virtual device image to generate the first video according to at least one of a point in time of obtaining the operation data or determined target response data.

15. An electronic device, comprising:
a memory storing a computer program; and
a processor configured to execute the computer program to:
  obtain operation data of the electronic device and response data generated by the electronic device based on the operation data;
  obtain a virtual device image matching the electronic device, the virtual device image including an appearance of the electronic device; and
  associate the operation data and the response data with the virtual device image according to a pre-determined processing strategy to generate a first video, the first video including:
    a first sub-video capturing an operation state outside a screen of the electronic device; and
    a second sub-video including contents displayed on the screen of the electronic device.

16. The electronic device according to claim 15, wherein the processor is further configured to:
  obtain the operation data of at least one of the electronic device itself, a component of the electronic device, or an associated device of the electronic device, the associated device being a device that causes the electronic device to generate the response data based on the operation data.

17. The electronic device according to claim 16, wherein the processor is further configured to:
  determine whether a device that generates the operation data is the associated device of the electronic device through a source of the operation data;
  when the associated device generates the operation data, obtaining parameter information of the associated device; and
  based on the parameter information, generating the virtual device image of the associated device.

18. The electronic device according to claim 15, wherein the processor is further configured to:
  associate the first sub-video generated from the operation data and the second sub-video generated from the response data with the virtual device image to generate the first video according to at least one of a point in time of obtaining the operation data or determined target response data.

19. The electronic device according to claim 18, wherein the processor is further configured to:
  determine a first point in time of obtaining the operation data, generating the first sub-video from the operation data corresponding to the first point in time, generating the second sub-video from the response data corresponding to the operation data, and associating the first sub-video and the second sub-video with the virtual device image to generate the first video; or
  determine a target response data, generating the first sub-video from the operation data corresponding to the determined target response data, generating the second sub-video from the target response data, and associating the first sub-video and the second sub-video with the virtual device image to generate the first video; or
  determine a second point in time of obtaining target operation data, generating the first sub-video from the operation data corresponding to the second point in time, generating the second sub-video from the determined target response data; and associating the first sub-video and the second sub-video with the virtual device image to generate the first video.

20. The electronic device according to claim 19, wherein the processor is further configured to:
  process the operation data to generate the first sub-video includes generating simulated operations to be performed on at least one of the electronic device itself, the component of the electronic device, or the associated device of the electronic device based on the operation data, and generating the first sub-video according to at least the point in time or the corresponding response data; and/or
  associate the first sub-video and the second sub-video with the virtual device image to generate the first video includes superimposing video frames of the first sub-video and video frames of the second sub-video on the virtual device image to generate the first video, or tiling the video frames of the first sub-video and the video frames of the second sub-video on an inside and an outside of the virtual device image respectively to generate the first video.

* * * * *